(12) United States Patent
Mushing et al.

(10) Patent No.: US 11,961,076 B2
(45) Date of Patent: Apr. 16, 2024

(54) TRANSACTION DEVICE SECURITY

(71) Applicant: MASTERCARD INTERNATIONAL INCORPORATED, Purchase, NY (US)

(72) Inventors: Alan Mushing, Northwich (GB); Fernando Lourenco, Wirral (GB)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 173 days.

(21) Appl. No.: 17/344,885

(22) Filed: Jun. 10, 2021

(65) Prior Publication Data
US 2021/0390542 A1 Dec. 16, 2021

(30) Foreign Application Priority Data

Jun. 11, 2020 (EP) .................................... 20179561

(51) Int. Cl.
*G06Q 20/40* (2012.01)
*G06Q 20/34* (2012.01)
*G06Q 20/38* (2012.01)

(52) U.S. Cl.
CPC ......... *G06Q 20/401* (2013.01); *G06Q 20/341* (2013.01); *G06Q 20/3825* (2013.01); *G06Q 2220/00* (2013.01)

(58) Field of Classification Search
CPC . G06Q 20/401; G06Q 20/3825; G06Q 222/00
USPC ........................................................... 705/75
See application file for complete search history.

(56) References Cited

U.S. PATENT DOCUMENTS

| 8,944,333 B1* | 2/2015 | Mullen | G06K 19/16 235/494 |
| 10,885,413 B1* | 1/2021 | Scholl | G06K 19/06037 |
| 2008/0301464 A1* | 12/2008 | Parkinson | H04L 9/3247 726/20 |
| 2011/0174874 A1* | 7/2011 | Poznansky | G07F 7/0813 235/379 |
| 2015/0235225 A1* | 8/2015 | Christie | G06K 19/16 705/72 |

(Continued)

FOREIGN PATENT DOCUMENTS

| EP | 1564680 A1 * | 8/2005 | ............. G06K 19/10 |
| EP | 3 279 849 A1 | 2/2018 | |

(Continued)

*Primary Examiner* — Courtney P Jones
(74) *Attorney, Agent, or Firm* — LOZA & LOZA, LLP

(57) ABSTRACT

There is provided a transaction device comprising a chip enclosure comprising a readable reference code; a chip embedded in the chip enclosure, the chip having the reference code stored therein; wherein the chip is configured to generate a cryptographically signed version of the reference code stored in the chip upon receipt of a request message, such that the reference code can be retrieved from the cryptographically signed version of the reference code for comparison with the readable reference code. There is also provided a method of a manufacturing a transaction device, wherein the method comprises storing a reference code in a chip; positioning the chip on a chip enclosure; embedding the chip in the chip enclosure; and applying the reference code to the chip enclosure in a readable format.

15 Claims, 11 Drawing Sheets

(56) References Cited

U.S. PATENT DOCUMENTS

| | | | |
|---|---|---|---|
| 2015/0294303 A1* | 10/2015 | Hanson | G06Q 20/10 235/379 |
| 2015/0295920 A1* | 10/2015 | Van Kerrebroeck | G06F 21/44 726/9 |
| 2021/0133756 A1* | 5/2021 | Dintenfass | G06Q 20/20 |
| 2021/0295308 A1* | 9/2021 | Dottax | G06Q 20/341 |

FOREIGN PATENT DOCUMENTS

| | | |
|---|---|---|
| WO | 2007/149830 A2 | 12/2007 |
| WO | 2008/041980 A2 | 4/2008 |

* cited by examiner

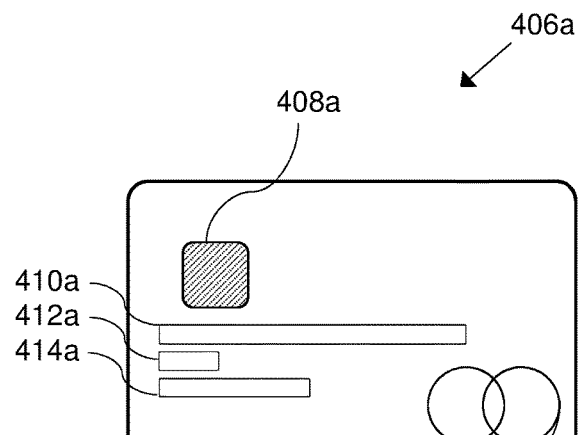
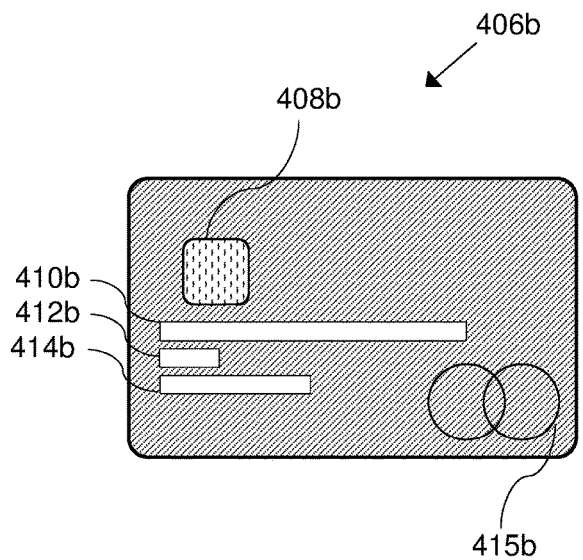
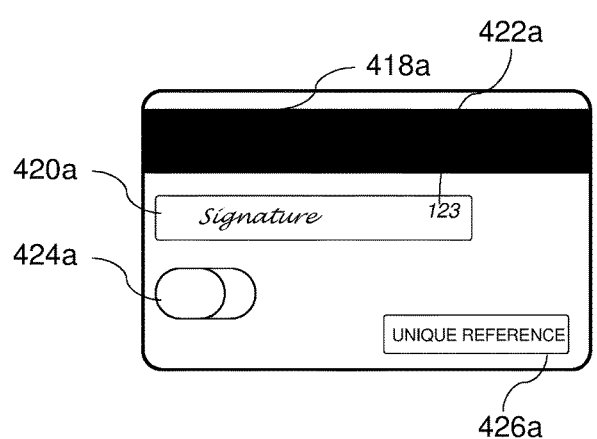
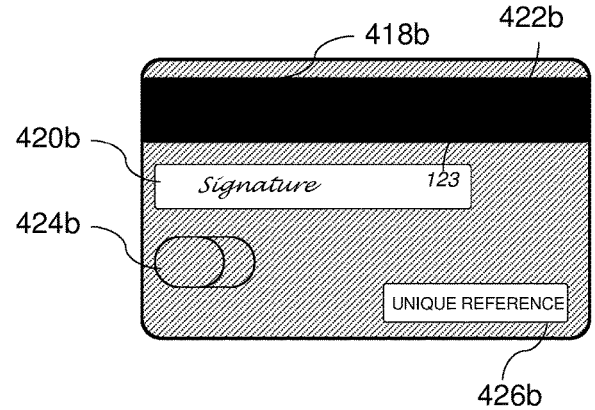
FIGURE 4aFIGURE 4b

TRANSACTION DEVICE SECURITY

CLAIM OF FOREIGN PRIORITY

The present application for Patents claims priority to European Patent Application number 20179561.4, filed Jun. 11, 2020, which is incorporated by reference hereto, and which is also assigned to assignee hereof.

TECHNICAL FIELD

The present disclosure relates to transaction device security. In embodiments, it relates to determining the genuineness of a transaction device such as a payment card and thereby improving the security of the transaction device.

BACKGROUND

A payment card, which is a particular example of a transaction device, typically contains printed information relating to a cardholder and a cardholder account and further secure information in a chip to support performance of a transaction. In order to initiate a payment transaction, a payment card can interact with a merchant's point-of-sale (POS) terminal by inserting the payment card into the POS terminal device and reading the payment data from the chip, or by swiping the payment card at the POS terminal device and reading the payment data from the magnetic stripe. Alternatively, the payment data can be manually entered at the POS terminal. As a further alternative, payment data can be read from the payment card in a contactless manner, namely by bringing the payment card into close proximity with a contactless reader at the merchant's POS terminal device.

A problem with such transaction devices is that they are subject to cloning and misuse. For example, a fraudster may attempt to clone a genuine payment card by removing the genuine chip from the genuine card, obtaining the cardholder and cardholder account information which is printed on the genuine card, and thereafter producing a fraudulent payment card which includes the genuine chip and a newly-manufactured card body comprising the obtained cardholder and cardholder account information. The resulting fraudulent payment card could then be used to carry out a fraudulent payment transaction. In some cases, the genuine chip could be replaced by a fake chip in the genuine card body to trick the cardholder into believing that the payment card as a whole is genuine.

Therefore, transaction devices such as payment cards are vulnerable to copying, misuse and fraudulent behaviour. Other transaction devices are subject to similar impersonation attacks. Holograms are often used in payment cards as a security feature. However, holograms only provide an indication that the payment card body is genuine, but they provide no indication of whether or not the chip is genuine. As discussed above, a fraudster could therefore replace the genuine chip of the genuine payment card with a fake chip and the hologram would indicate to the cardholder that the card body is genuine and thereby provide the impression that the payment card as a whole is genuine when in fact the genuine chip has been replaced with a fake chip. Detection of fraud in such cases is likely to be significantly delayed.

The present disclosure has been devised to mitigate or overcome at least some of the above-mentioned problems.

SUMMARY OF THE DISCLOSURE

According to a first aspect of the present disclosure, there is provided a transaction device comprising a chip enclosure comprising a readable reference code; a chip embedded in the chip enclosure, the chip having the reference code stored therein; wherein the chip is configured to generate a cryptographically signed version of the reference code stored in the chip upon receipt of a request message, such that the reference code can be retrieved from the cryptographically signed version of the reference code for comparison with the readable reference code.

In embodiments, the transaction device comprises a card form factor.

In some embodiments, the card form factor may be a payment card form factor.

In further embodiments, the payment card form factor may be in accordance with ISO/IEC 7810 ID-1.

In embodiments, the transaction device comprises a non-card form factor.

The transaction device comprising a non-card form factor may comprise a wearable device.

The wearable device may comprise a bracelet, a wristband, a watch or a ring.

The transaction device comprising a non-card form factor may comprise an attachment device.

The attachment device may comprise a sticker, key fob, or a tag.

In embodiments, the chip enclosure may comprise a QR code and the readable reference code may be encoded within the QR code.

In embodiments, the chip enclosure may comprise an invisible digital watermark and the readable reference code may be encoded within the invisible digital watermark.

In embodiments, the chip enclosure may comprise a visible digital watermark and the readable reference code may be encoded within the visible digital watermark.

The chip enclosure may comprise a hologram. In embodiments in which the chip enclosure comprises a QR code, the QR code may be printed within the hologram.

In embodiments in which the chip enclosure comprises an invisible digital watermark or a visible digital watermark, the digital watermark may be printed within the hologram.

According to a second aspect of the present disclosure, there is provided a method of a manufacturing a transaction device, the method comprising: storing a reference code in a chip; positioning the chip on a chip enclosure; embedding the chip in the chip enclosure; and applying the reference code to the chip enclosure in a readable format.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the disclosure will now be described, by way of example only, with reference to the accompanying drawings, in which:

FIG. 4a is a schematic diagram showing a genuine payment card body, whereby the genuine chip has been replaced by a fake chip, in accordance with the first embodiment of the present disclosure;

FIG. 4b is a schematic diagram showing a fake payment card body enclosing the genuine chip that has been removed from the genuine payment card body of FIG. 4a, in accordance with the first embodiment of the present disclosure;

DETAILED DESCRIPTION

Embodiments of the disclosure may be used for a number of different types of credential devices. Embodiments of present disclosure in which the credential device is a payment card transaction device are described first. Embodiments of the present disclosure in which the credential device is a non-card transaction device are then described.

The description below with respect to these embodiments is equally applicable to other card and non-card form factors which may not necessarily be transaction devices. For example, the present disclosure can be applied to identity cards or travel cards, or the non-card form factors described below but excluding any payment transaction capability.

Typical Payment Card as Transaction Device

A typical genuine payment card, in accordance with prior art, will first be described with reference to FIG. 1a and FIG. 1b.

Figure 1A:
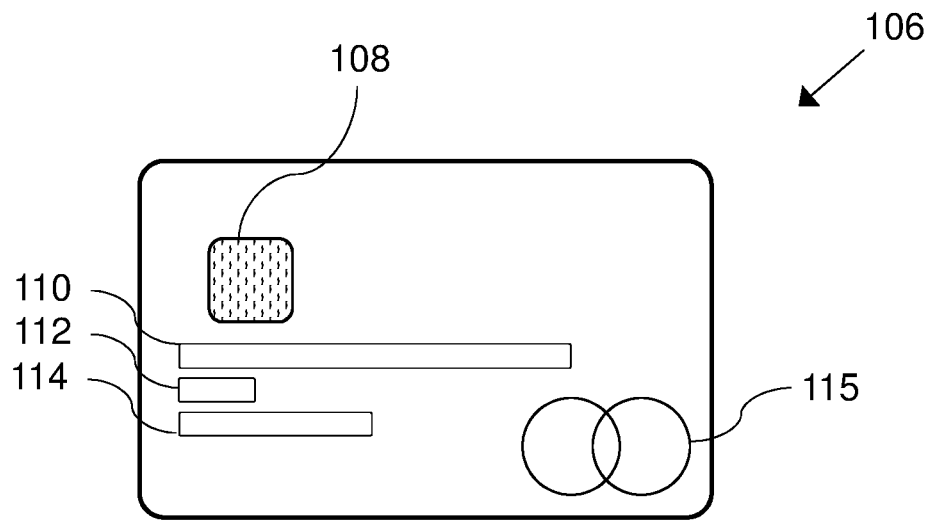
FIG. 1a is a schematic diagram showing the front face of a genuine payment card, in accordance with prior art.

The genuine payment card 106 comprises a chip 108, a primary account number 110, an expiration date 112, and a cardholder name 114, all of which are normally visible on the front face of the payment card 106, as shown in FIG. 1a. The payment card 106 also has a payment network logo 115 printed on the front face of the payment card 106. The payment card 106 also comprises an antenna (not shown) for securing a connection with a contactless reader in completing a contactless transaction. The payment card 106 is therefore capable of performing both contact-based and contactless transactions.

Figure 1B:
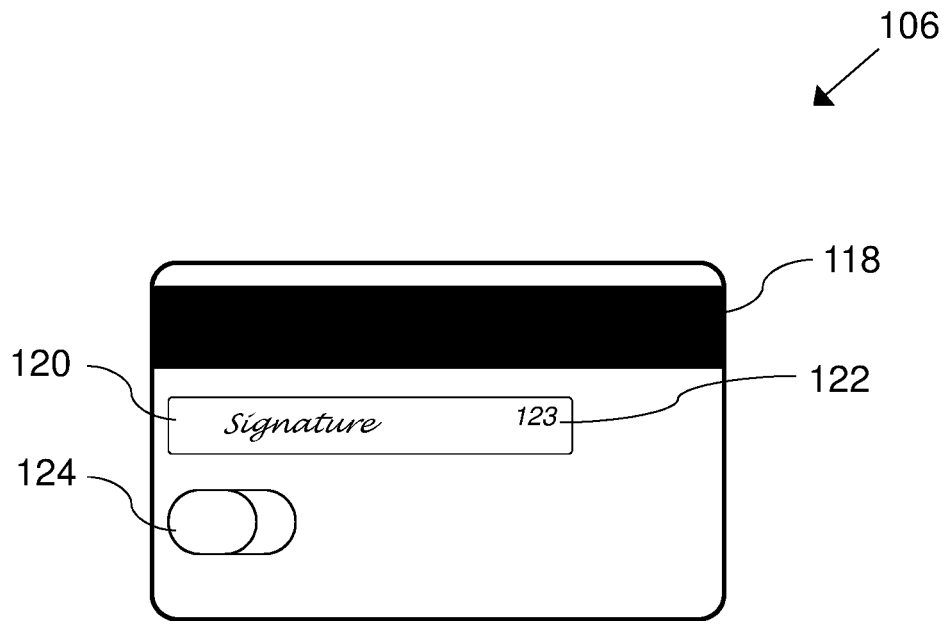
FIG. 1b is a schematic diagram showing the back face of the genuine payment card shown in FIG. 1a, in accordance with prior art.

On the back face of the payment card 106, the payment card 106 comprises a magnetic stripe 118, as shown in FIG. 1b. One or more cardholder verification codes are typically encoded within the magnetic stripe. The payment card 106 also has a signature strip 120 on the back face of the payment card 106. The signature strip 120 includes a printed cardholder verification code 122. Typically, there is only one cardholder verification code on the back face of the payment card. However, there may be several cardholder verification codes present on the back face of the payment card 106. For example, the payment card 106 may have a cardholder verification code encoded into the magnetic stripe 118, and a different cardholder verification code printed onto the signature panel 120 of the payment card 106. In addition, a hologram 124 is included on the back face of the payment card 106, whereby the hologram reflects light and appears animated when the payment card 106 is moved.

Typically, a cardholder initiates a purchase of goods or services from a merchant using the cardholder's payment card 106. In order to initiate the purchase, the payment card 106 can interact with a merchant's point-of-sale (POS) terminal device configured to read payment data from the payment card. Payment data can typically be read from the payment card 106 by inserting the payment card 106 into the POS terminal device 116 and reading the payment data from the chip 108, or by swiping the payment card 106 at the POS terminal device 116 and reading the payment data from the magnetic stripe. Alternatively, the primary account number, the expiration date, and the cardholder name can be read by the merchant from the payment card 106 and manually entered at the POS terminal device. As a further alternative, the payment data can be read from the payment card 106 in a contactless manner, namely by bringing the payment card 106 into close proximity with a contactless reader at the merchant's POS terminal device. Details of the payment card 106 and the transaction are sent to the issuer via the acquirer and the switch to authorise the transaction.

A fraudster aiming to undertake unauthorised purchases using a payment card can do so in a number of ways. For example, a fraudster may obtain the primary account number 110, expiration date 112, cardholder name 114 and cardholder verification code 122, and use the payment details to carry out an unauthorised transaction. Alternatively, a fraudster may attempt to clone the payment card and use the cloned payment card to carry out an unauthorised transaction.

Payment Card Cloning

Cloning of a typical and genuine payment card will now be discussed with reference to FIG. 2a and FIG. 2b.

Figures 2A, 2B:
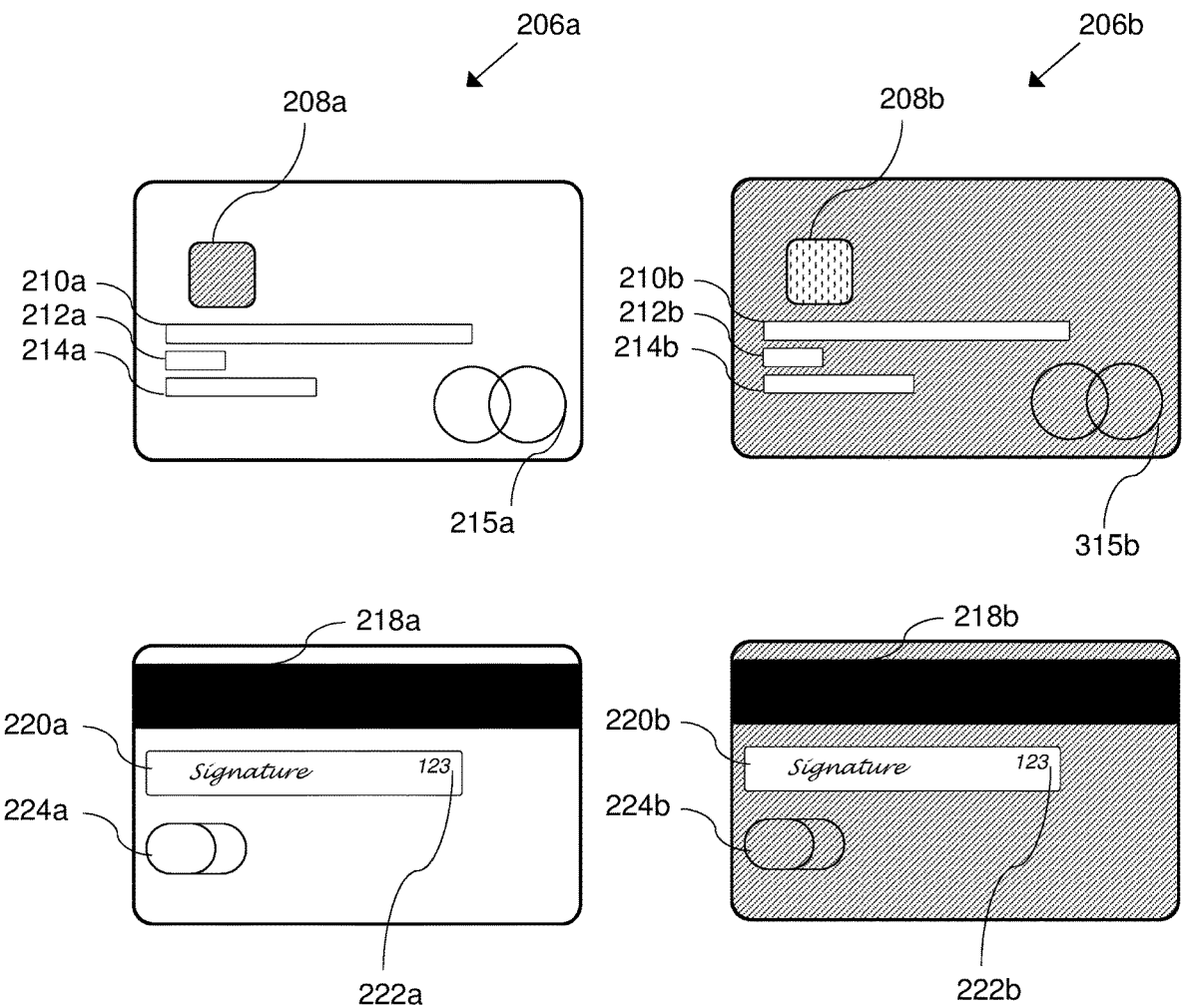
FIG. 2a is a schematic diagram showing a genuine payment card body, whereby the genuine chip has been replaced by a fake chip, in accordance with prior art.
FIG. 2b is a schematic diagram showing a fake payment card body enclosing the genuine chip that has been removed from the genuine payment card body of FIG. 2a, in accordance with prior art.

The front and back faces of a payment card 206a are shown in FIG. 2a, whereby the chip has been removed from the body of the payment card 206a and replaced by a fake chip. The payment card 206a shown in FIG. 2a comprises a primary account number 210a, an expiration date 212a, and a cardholder name 214a, all of which are visible on the front face of the payment card 206a. The payment card 206a also has a payment network logo 215a on the front face. On the back face of the payment card 206a, the payment card 206a comprises a magnetic stripe 218 and a signature strip 220a, where the signature strip 220a includes a printed cardholder verification code 222a, and a hologram 224a.

In contrast to the genuine payment card 106 shown in FIGS. 1a and 1b, the body of the payment card 206a of FIG. 2a does not include a genuine chip. The genuine chip has been removed from the body of the payment card 206a by a fraudster and replaced by a fake chip 208a. The fake chip 208a may be similar to or identical in appearance to the genuine chip. The fraudster may remove the genuine chip from the payment card body by, for example, melting the adhesive that binds the chip to the payment card body. In this way, the fraudster is able to use the genuine chip to gain access to payment credentials for use in carrying out a fraudulent payment transaction whilst not alarming the cardholder. The payment card 206a comprising the fake chip 208a gives the impression to the cardholder that the payment card 206a is genuine and has not been tampered with. As a result, detection of fraud is likely to be delayed.

Meanwhile, the fraudster may produce a replica or fake payment card body for enclosing the genuine chip 208b that has been removed from the body of the payment card 206a of FIG. 2a. The replica payment card 206b is shown in FIG. 2b. The replica payment card 206b comprises the features of the original payment card 206a, namely the primary account number 210b, the expiration date 212b, and the cardholder name 214b, the payment network logo 215b on the front face of the payment card 206b, and the magnetic stripe 218b, the signature strip 220b, and the hologram 224b, where the signature strip 220b includes the printed cardholder verification code 222b. Problematically, the replica payment card 206b can thereby be used to perform unauthorised payment transactions. The hologram 224b can be used to check whether the payment card body is genuine. However, the hologram only provides an indication of whether the payment card body is genuine but it provides no indication of whether the chip is genuine or whether the chip belongs to the payment card body.

General and specific embodiments of the disclosure will now be described with reference to FIGS. 3a to 11.

Payment Card in Accordance with a First Embodiment of the Present Disclosure

A payment card 306, in accordance with a first embodiment of the present disclosure, will now be described with reference to FIG. 3a and FIG. 3b.

Figure 3A:
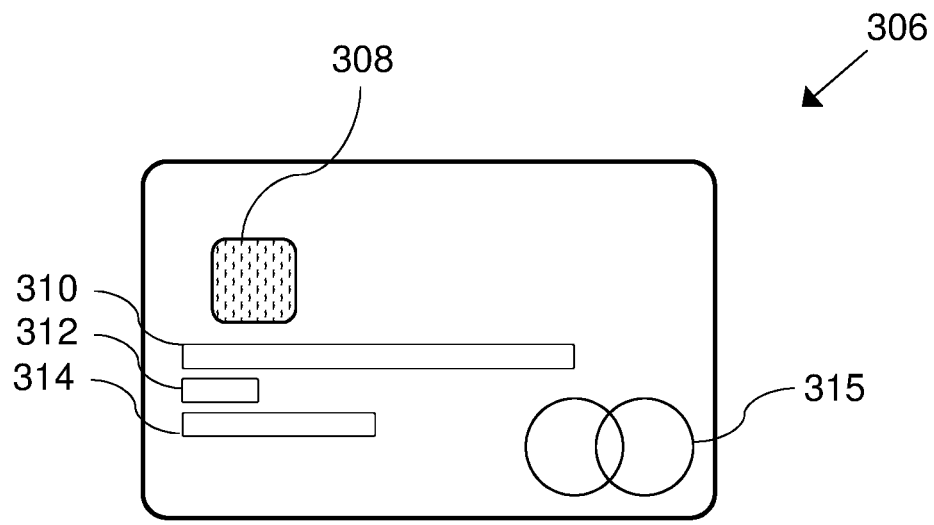
FIG. 3a is a schematic diagram showing the front face of a payment card which includes a chip, in accordance with a first embodiment of the present disclosure.

The front face of a payment card 306 in accordance with a first embodiment of the present disclosure is shown in FIG. 3a.

The payment card 306, which is an example of a credential device and payment device, comprises a payment chip 308 which is visible on the front face of the payment card 306. The payment card 306 comprises a substrate whereby the payment chip 308 is embedded in the substrate. The chip may be an EMV chip, thereby associated with the EMV chip specifications. The secure EMV chip provides the ability to store confidential information securely, perform processing functions and perform cryptographic processing. The chip has a first set of payment card credential data, or first credential data, installed therein. The first credential data is credential data for an account associated with the payment card. The first credential data can include, for example, the primary account number, expiration date, and cardholder name, but may extend beyond this to cryptographic keys obtained directly or indirectly from a card issuer and associated with the user account. The chip also has a payment application installed therein, the payment application being adapted to use the first credential data.

The payment card 306 further comprises a primary account number 310, an expiration date 312, and a cardholder name 314 on its front face. The payment card 306 further comprises a payment network logo 315 which is also visible on the front face of the payment card 306. The payment card 306 also comprises an antenna (not shown) for securing a connection with a contactless reader in completing a contactless transaction. The payment card 306 is therefore capable of performing both contact-based transactions, e.g. via the chip 308, and contactless transactions, e.g. via NFC capability.

On the back face, the payment card 306 comprises a magnetic stripe 318, a signature strip 320, wherein the signature strip 320 includes a printed cardholder verification code 322, and a hologram 324. The hologram 324 provides an indication of whether the payment card body is genuine.

The back face of the payment card 306 also comprises a unique reference code 326. The unique reference code 326 provides a unique property and thereby reflects the uniqueness of the payment card body. The unique reference code 326 may comprise numerical, alphabetical or alphanumeric characters. The unique reference code 326 is engraved into the payment card body on the back face. In embodiments, the unique reference code 326 may be applied to the payment card body in other ways, for example by printing.

The same unique reference code is stored within the memory of the chip 308 at the time of manufacturing the payment card 306. The payment application, which is comprised within the chip 308, has access to at least one key pair for asymmetric encryption (using RSA or another asymmetric encryption scheme such as ECC) and is therefore able to sign the unique reference code using its private key such that another party can verify the value by using the public key. Upon receipt of a digital signature request, a digital signature generator component within the payment application generates a cryptographically signed version of the unique reference code that is stored within the memory of the chip 308.

This could take place, for example, during a transaction. In a transaction issued under EMV protocols, the terminal issues commands to the card, and the card responds. A new command could be created to instruct the card to provide its digitally signed reference code, and this could be returned with responses to other commands. This could take place, for example, in exchanges of information prior to the performance of a transaction itself, but after selection of an application for performing a transaction at the card. This would allow a user of the terminal to abort the transaction if the value returned by the card was displayed at the terminal and not matched by the readable form of the unique reference number on the card body.

In other embodiments, the cryptographically signed version of the unique reference code may only be read by an authorised user or an authorised third party. This would require a more complex interaction, as it would be necessary either for the card to be able to establish who was an authorised party, or it would be necessary for the reference number to be further encrypted so that the authorised party would need to interact with another party that could establish who was authorised. For example, this could be achieved by encrypting the reference number with the public key of a third party service, and then digitally signing this result. The authorised user would be able to use the card public key to produce the reference number encrypted with the third party service public key, and could submit this to the third party service once it had verified to the third party service that it was indeed an authorised party. The third party service could then use its private key to decrypt the reference number and provide it to the authorised party.

In order to detect whether the chip is genuine and belongs to the payment card body by which it is enclosed, a user can obtain the cryptographically signed version of the unique reference code and subsequently the unique reference code itself. The unique reference code from the chip can be compared with the unique reference code 326 that is engraved on the back face of the payment card 306. If the unique reference code obtained from the chip 308 matches the unique reference code obtained from the engraving on the payment card 306 itself, then the chip 308 is determined as being a genuine chip which belongs to the payment card body. The chip 308 and the payment card body which encloses the chip are both determined as being synergistically genuine.

In some embodiments, the payment application may become inactive upon expiry of the payment card. The payment application of the chip 308 would thus only be capable of generating a cryptographically signed version of the unique reference code during the lifetime of the payment card.

Cloning Attempt of Payment Card in Accordance with the First Embodiment of the Present Disclosure An attempt to clone the payment card of the first embodiment of the present disclosure will now be discussed with reference to FIG. 4a and FIG. 4b.

The front and back faces of the payment card 406a are shown in FIG. 4a, whereby the chip has been removed from the body of the payment card 406a and replaced by a fake chip in an attempt to clone the payment card 406a. The payment card 406a shown in FIG. 4a comprises a primary account number 410a, an expiration date 412a, and a cardholder name 414a, all of which are visible on the front face of the payment card 406a. The payment card 406a also has a payment network logo 415a on the front face. On the back face of the payment card 406a, the payment card 406a comprises a magnetic stripe 418a and a signature strip 420a, where the signature strip 420a includes a printed cardholder verification code 422a, and a hologram 424a.

The payment card 406a also comprises a unique reference code 426a on the back face. The unique reference code 426a provides a unique property of the payment card body and is printed on the payment card body.

Suspected cloning of the payment card 406a can be approached by the user of the payment card 406a of the present embodiment as follows. The user can also follow the method outlined below to check periodically whether the chip is genuine and belongs to the payment card body by which it is enclosed, whether or not cloning of the payment card 406a is suspected.

First, the user submits a request to prompt the chip 408a to generate a cryptographically signed version of the unique reference code saved in its memory. The user then obtains the unique reference code from the cryptographically signed version of the unique reference code.

A mobile banking app can then be used to compare the unique reference code from the chip with the unique reference code 426a that is printed on the back face of the payment card 406a, and to determine whether or not the two unique reference codes match. Alternatively, the unique reference code from the chip may be displayed on the screen for the user to manually compare to the unique reference code 426a that is printed on the back face of the payment card 406a.

In the event that the unique reference code obtained from the chip matches the unique reference code printed on the payment card 406a itself, the chip would be determined as being a genuine chip which belongs to the payment card body. The chip and the payment card body which encloses the chip would both determined as being synergistically genuine.

However, the body of the payment card 406a of FIG. 4a does not include a genuine chip. The genuine chip has been removed from the body of the payment card 406a by a fraudster and replaced by a fake chip 408a. The fake chip 408a may be similar to or identical in appearance to the genuine chip. In the present example, the unique reference code obtained from the fake chip 408a of the payment card 406a that the user is in possession of does not match the unique reference code 426a that is printed on the back face of the payment card 406a. This provides an indication that the chip 408b is not genuine and does not belong to the payment card body.

Meanwhile, the fraudster may produce a replica or fake payment card body for enclosing the genuine chip 408b that has been removed from the body of the payment card 406a of FIG. 4a. The replica payment card 406b is shown in FIG. 4b. The replica payment card 406b comprises the features of the original payment card 406a, namely the primary account number 410b, the expiration date 412b, and the cardholder name 414b, the payment network logo 415b on the front face of the payment card 406b, and the magnetic stripe 418b, the signature strip 420b, and the hologram 424b, where the signature strip 420b includes the printed cardholder verification code 422b. Since a mechanism to establish whether the chip is genuine and whether the chip belongs to the card body is provided in the present embodiment, the user is able to learn quickly that the payment card 406a has been subjected to fraud and take action with the issuing bank accordingly. For example, action could be taken to deactivate the original chip 408b so that the replica payment card 406b cannot be used to perform unauthorised payment transactions.

Payment Card in Accordance with a Second Embodiment of the Present Disclosure

A payment card 506, in accordance with a second embodiment of the present disclosure, will now be described with reference to FIG. 5a and FIG. 5b. Many of the features of the payment card of the first embodiment are also present in the payment card 506 of the second embodiment. Only the differences between the embodiments will be described in further detail below. It should therefore be noted that any features described above with respect to the first embodiment can be incorporated into the second embodiment.

Figure 5A:
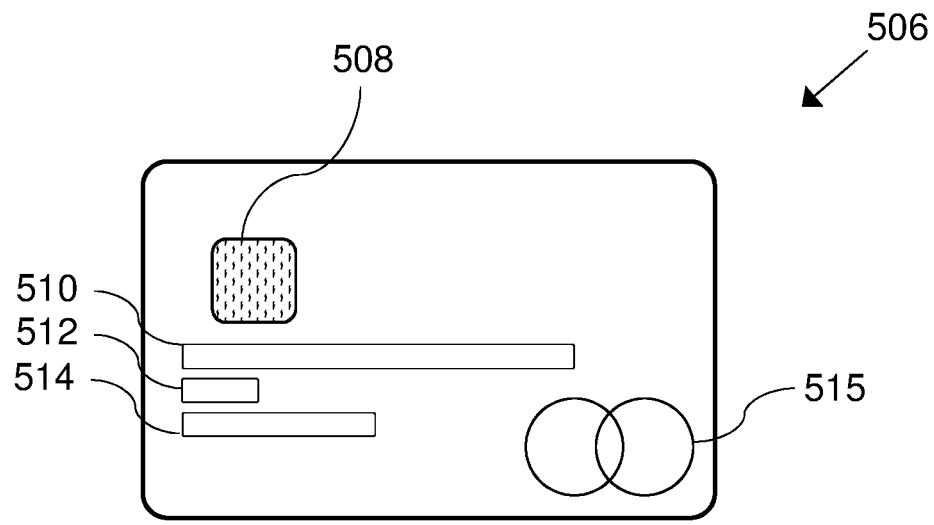
FIG. 5a is a schematic diagram showing the front face of a payment card which includes a chip, in accordance with a second embodiment of the present disclosure.
Figure 5B:
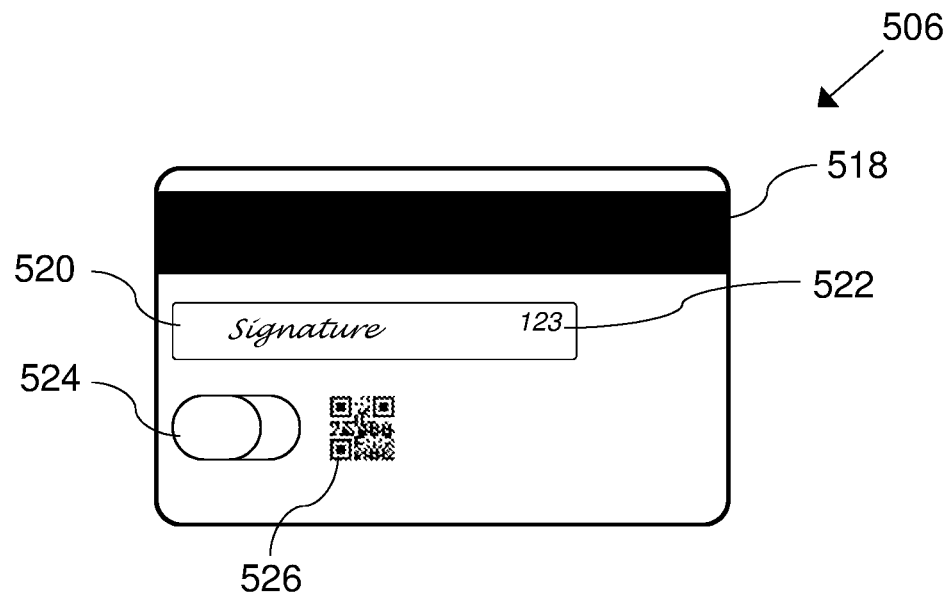
FIG. 5b is a schematic diagram showing the back face of the payment card shown in FIG. 5a, the back face including a QR code comprising a unique reference code, in accordance with the second embodiment of the present disclosure.

The front face of a payment card 506 in accordance with the second embodiment of the present disclosure is shown in FIG. 5a. The features on the front face of the payment card 506 are identical to the features on the front face of the payment card 506 of the first embodiment described above. Namely, as shown on the front face the payment card 506 comprises a payment chip 508 embedded in a substrate, a primary account number 510, an expiration date 512, a cardholder name 514, and a payment network logo 515 and an antenna (not shown).

On the back face, the payment card 506 comprises a magnetic stripe 518, a signature strip 520, wherein the signature strip 520 includes a printed cardholder verification code 522, and a hologram 524. The hologram 524 provides an indication of whether the payment card body is genuine.

The back face of the payment card 506 also comprises a QR code 526. A unique reference code, which provides a unique property and thereby reflects the uniqueness of the payment card body, is embedded within the QR code. The unique reference code may be embedded in any machine-readable format such as a QR code. The QR code is readable by a software application or 'app' installed on a smartphone (the software app and smartphone discussed in further detail below with reference to FIG. 10 and FIG. 11).

In some embodiments, the unique reference code may be printed or engraved onto the payment card body alongside the QR code 526 in order to provide the user with the option of obtaining the unique reference code directly from the payment code body or by scanning the QR code with a suitable device, e.g. a smartphone.

Figure 3B:
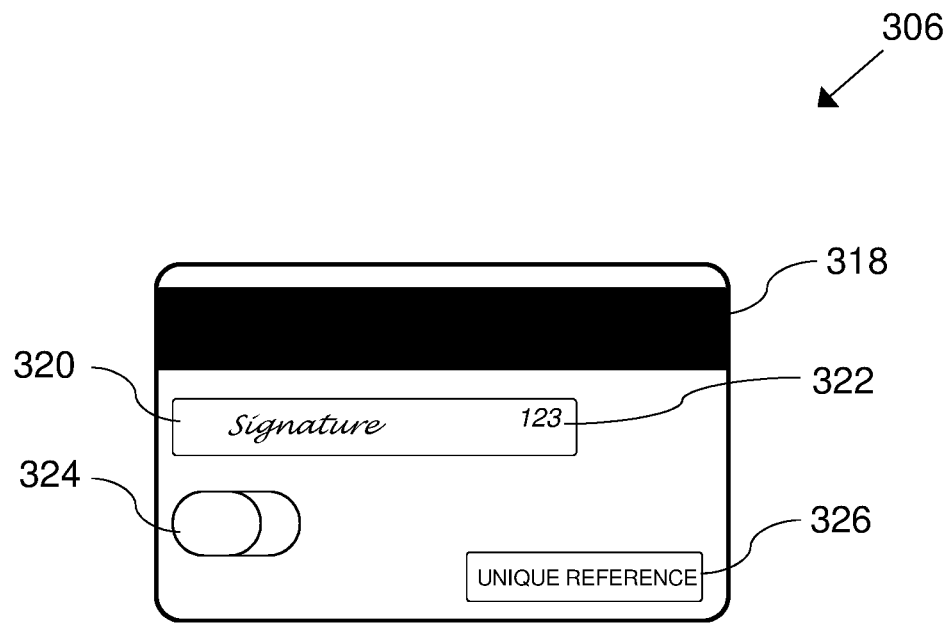
FIG. 3b is a schematic diagram showing the back face of the payment card shown in FIG. 3a, the back face including an engraved unique reference, in accordance with a first embodiment of the present disclosure.

Storage of the unique reference code within the memory of the chip 508, and features which enables detection of whether the chip is genuine and belongs to the payment card body are the same as that described above in the first embodiment with reference to FIG. 3a and FIG. 3b. In addition, an attempt to clone the payment card 506 is analogous to that described above in the first embodiment with reference to FIG. 4a and FIG. 4b.

Payment Card in Accordance with a Third Embodiment of the Present Disclosure

Figure 6A:
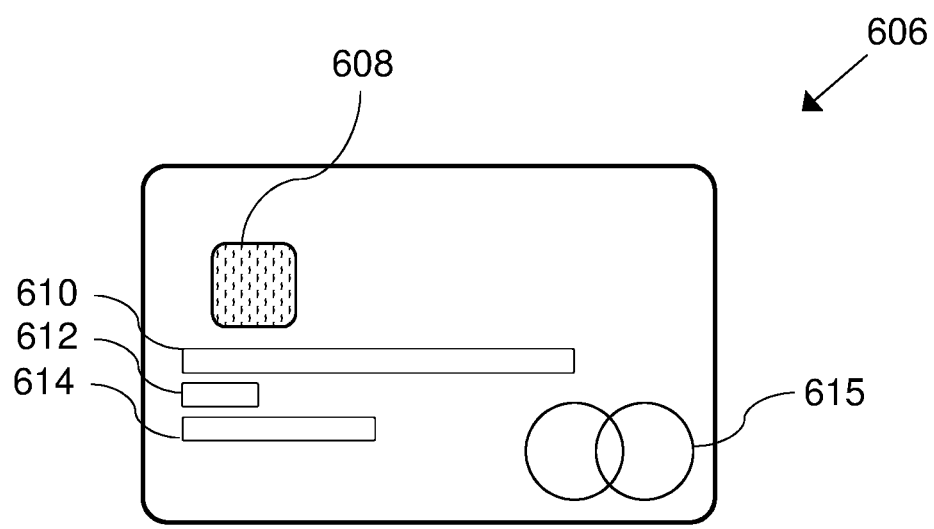
FIG. 6a is a schematic diagram showing the front face of a payment card which includes a chip, in accordance with a third embodiment of the present disclosure.
Figure 6B:
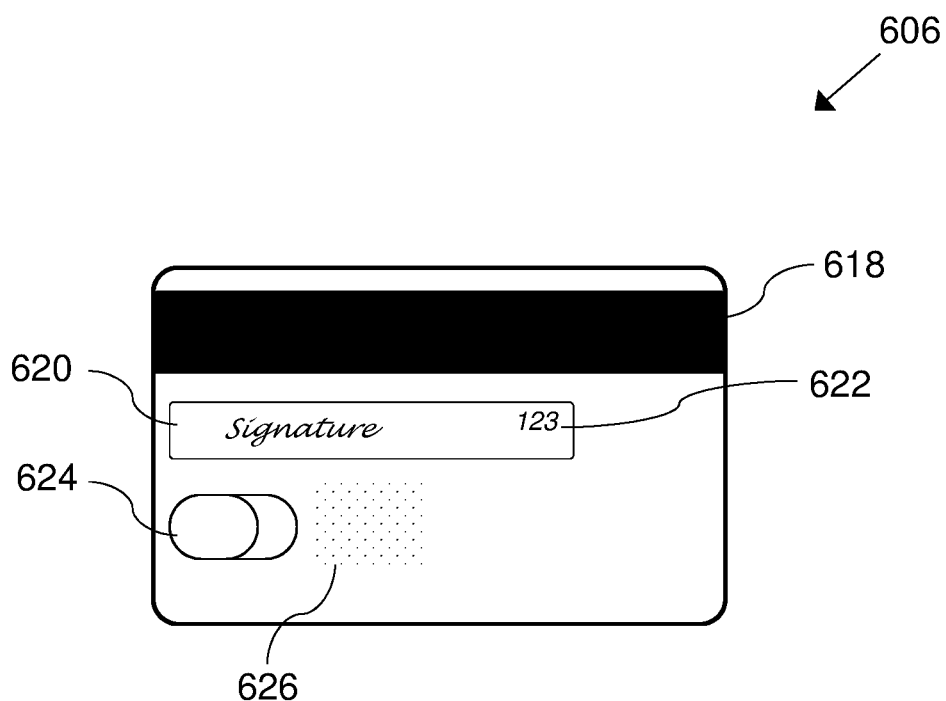
FIG. 6b is a schematic diagram showing the back face of the payment card shown in FIG. 6a, the back face including a digital watermark comprising a unique reference code, in accordance with the third embodiment of the present disclosure.

A payment card 606, in accordance with a third embodiment of the present disclosure, will now be described with reference to FIG. 6a and FIG. 6b. The payment card 606 of the third embodiment is identical to the payment card 606 of the second embodiment except the format in which the unique reference code is provided on the back face of the payment card 606.

The front face of the payment card 606 comprises at least a payment chip 608 embedded in a substrate, a primary account number 610, an expiration date 612, a cardholder name 614, and a payment network logo 615 and an antenna (not shown).

The back face of the payment card 606 comprises at least a magnetic stripe 618, a signature strip 620, wherein the signature strip 620 includes a printed cardholder verification code 622, and a hologram 624. The hologram 624 provides an indication of whether the payment card body is genuine.

The back face of the payment card 606 also comprises a digital watermark 626. A unique reference code, which provides a unique property and thereby reflects the uniqueness of the payment card body, is embedded within the digital watermark. The digital watermark is readable by a software application or 'app' installed on a smartphone (the software app and smartphone discussed in further detail below with reference to FIG. 10 and FIG. 11).

Digital watermarking technology provides a method of embedding data into digital multimedia content. Digital watermarking technology can include visible digital watermarking where visible data is embedded as the watermark, e.g. a logo or text. Digital watermarking technology can also include invisible digital watermarking where the data embedded is invisible. Embodiments of the present disclosure may involve either visible digital watermarking or invisible digital watermarking. An example of using visible digital watermarking in the present disclosure is where the unique reference code may be visibly encoded within a logo image that is printed on a substrate of the payment card. Invisible digital watermarking can be used to embed the unique reference code invisibly onto the substrate of the payment card.

Payment Card in Accordance with a Fourth Embodiment of the Present Disclosure

Figure 7A:
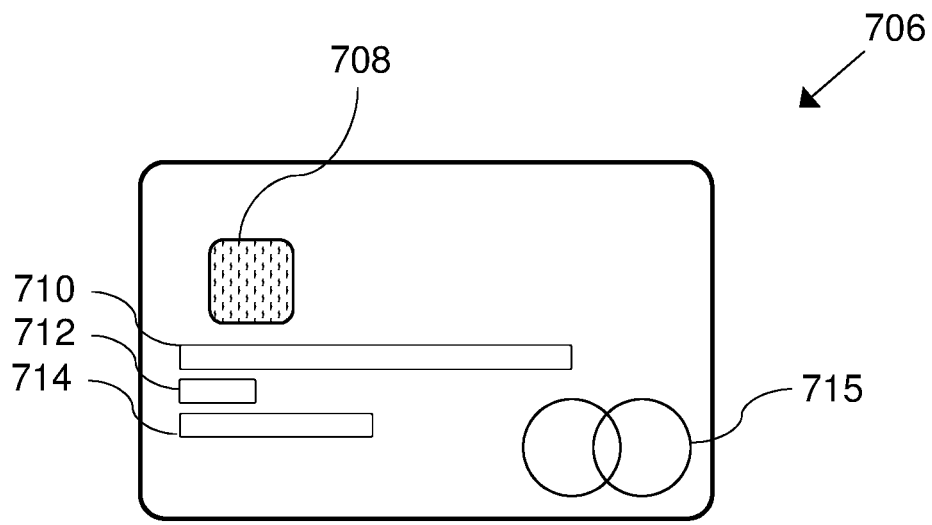
FIG. 7a is a schematic diagram showing the front face of a payment card which includes a chip, in accordance with a fourth embodiment of the present disclosure.
Figure 7B:
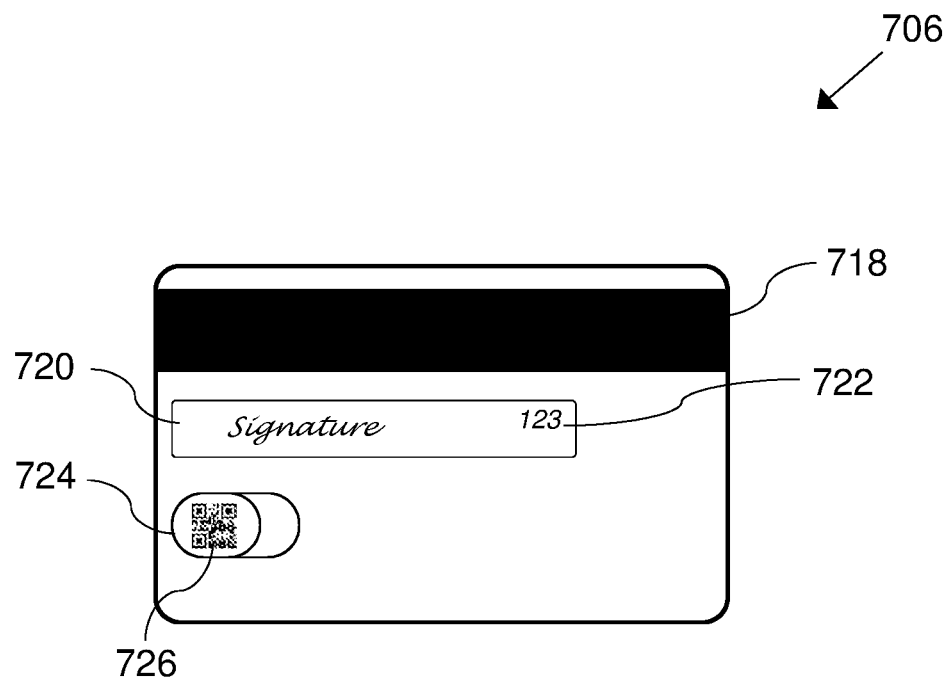
FIG. 7b is a schematic diagram showing the back face of the payment card shown in FIG. 7a, the back face including a QR code embedded within a hologram, in accordance with the fourth embodiment of the present disclosure.

A payment card 706, in accordance with a fourth embodiment of the present disclosure, will now be described with reference to FIG. 7a and FIG. 7b. The payment card 706 of the fourth embodiment is identical to the payment card 706 of the second embodiment except the format in which the unique reference code is provided on the back face of the payment card 706.

The front face of the payment card 706 comprises at least a payment chip 708 embedded in a substrate, a primary account number 710, an expiration date 712, a cardholder name 714, and a payment network logo 715 and an antenna (not shown).

The back face of the payment card 706 comprises at least a magnetic stripe 718, a signature strip 720, wherein the signature strip 720 includes a printed cardholder verification code 722, and a hologram 724. The hologram 724 itself provides an indication of whether the payment card body is genuine. A QR code 726 comprising an embedded unique reference code, which provides a unique property and thereby reflects the uniqueness of the payment card body, is included within the hologram 724. Embedding the QR code 726 within the hologram 726 simplifies the manufacturing process and thereby reduces manufacturing costs. The QR code 726 is readable by a software application or 'app' installed on a smartphone (the software app and smartphone discussed in further detail below with reference to FIG. 10 and FIG. 11).

Payment Card in Accordance with a Fifth Embodiment of the Present Disclosure

Figure 8A:
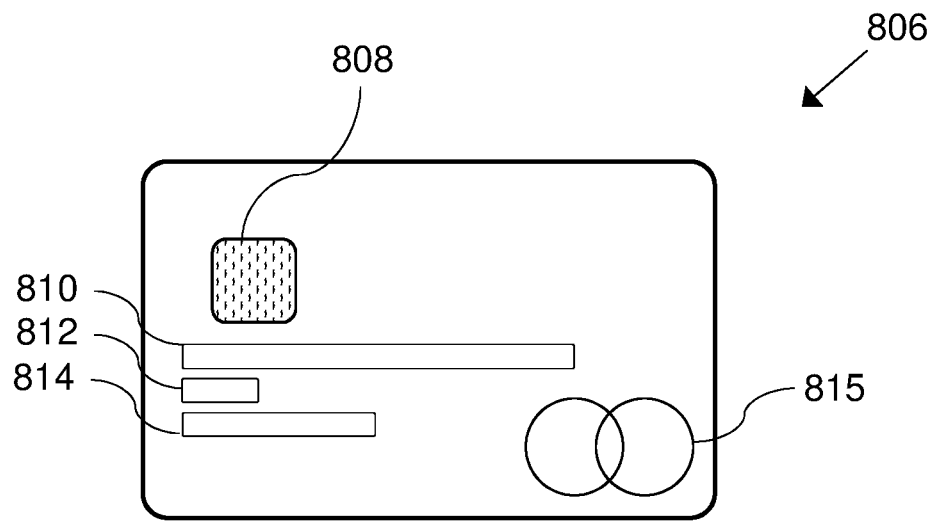
FIG. 8a is a schematic diagram showing the front face of a payment card which includes a chip, in accordance with a fifth embodiment of the present disclosure.
Figure 8B:
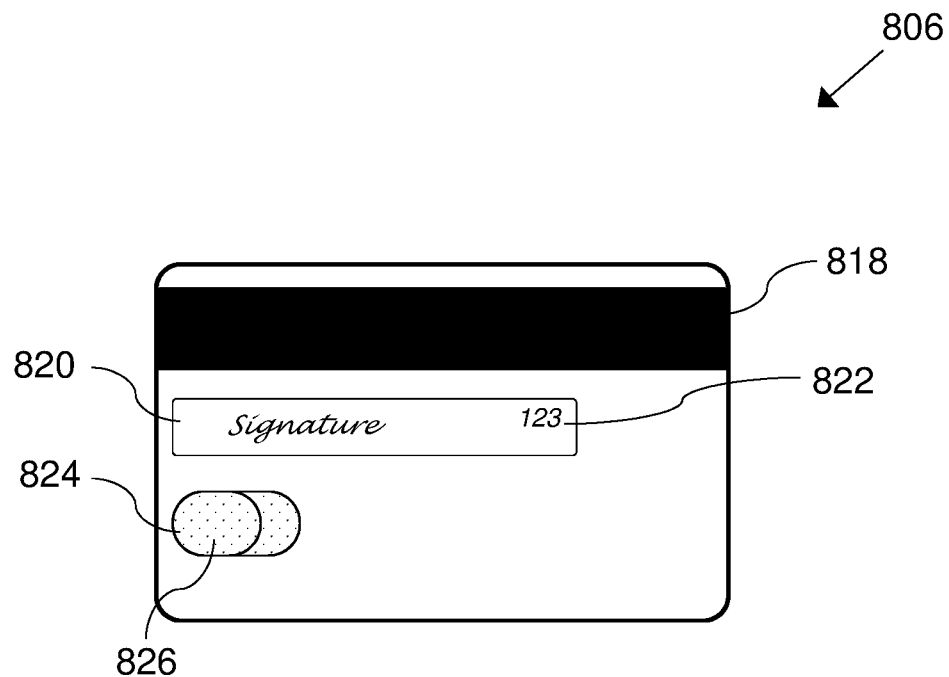
FIG. 8b is a schematic diagram showing the back face of the payment card shown in FIG. 8a, the back face including a digital watermark embedded within a hologram, in accordance with the fifth embodiment of the present disclosure.

A payment card 806, in accordance with a fifth embodiment of the present disclosure, will now be described with reference to FIG. 8*a* and FIG. 8*b*. The payment card 806 of the fifth embodiment is identical to the payment card 806 of the second embodiment except the format in which the unique reference code is provided on the back face of the payment card 806.

The front face of the payment card 806 comprises at least a payment chip 808 embedded in a substrate, a primary account number 810, an expiration date 812, a cardholder name 814, and a payment network logo 815 and an antenna (not shown).

The back face of the payment card 806 comprises at least a magnetic stripe 818, a signature strip 820, wherein the signature strip 820 includes a printed cardholder verification code 822, and a hologram 824. The hologram 824 itself provides an indication of whether the payment card body is genuine. In the present embodiment, a digital watermark 826 is included on the back face of the payment card 806 in an overlapping position with the hologram 824. A unique reference code, which provides a unique property and thereby reflects the uniqueness of the payment card body, is embedded within the digital watermark. The digital watermark is readable by a software application or 'app' installed on a smartphone (the software app and smartphone discussed in further detail below with reference to FIG. 10 and FIG. 11).

The digital watermark 826 may be a visible digital watermark where visible data is embedded as the watermark, e.g. a logo or text, or an invisible digital watermarking where the data embedded is invisible.

Non-Card Devices for Implementing Embodiments of the Present Disclosure

In the examples provided above in the first to fifth embodiments, the chip is enclosed within a payment card body as the chip enclosure. A chip enclosed within a payment card body is an example of card form factor. It should be noted that alternative chip enclosures may be used. It is also to be understood that a payment card is used in the examples above as a non-limiting example of a transaction device. In other embodiments, the transaction device may be an alternative transaction device carrying payment data and the unique reference code. For example, a non-card form factor could be used as the transaction device, e.g. rings, stickers, key fobs, or tags.

As such, the present disclosure can be implemented using card devices such as a payment card or non-card devices. Examples of non-card devices that can be used as transaction devices include contactless-enabled devices for use as wearables, such as bracelets, wristbands, watches, rings and any other known wearable. In the case of wearable devices, the chip enclosure which comprises a readable unique reference code is, for example, the band of the bracelet, wristband, watch or ring. Further examples of non-card devices that can be used as transaction devices include contactless-enabled devices for attachment to belongings such as stickers, key fobs and tags. In the case of attachment devices, the chip enclosure which comprises a readable unique reference code is, for example, the body of the sticker, the body of the key fob or the body of the tag. In all of the above examples, the chip enclosure is capable of housing the chip.

In some embodiments, a contactless-only non-card device may be used as the transaction device, whereby contactless-only non-card devices can be defined as non-card devices which have a contactless interface, but not a contact interface, and thereby transact at POS terminals using the contactless interface. Typically, such contactless-only non-card devices transact at POS terminals using NFC technology, but may be able to transact in other ways, such as via QR codes. Specific examples of non-card transaction devices suitable for implementing embodiments of the present disclosure are provided below with reference to FIGS. 9*a* to 9*d*.

Wristband in Accordance with a Sixth Embodiment of the Present Disclosure

Figure 9A:
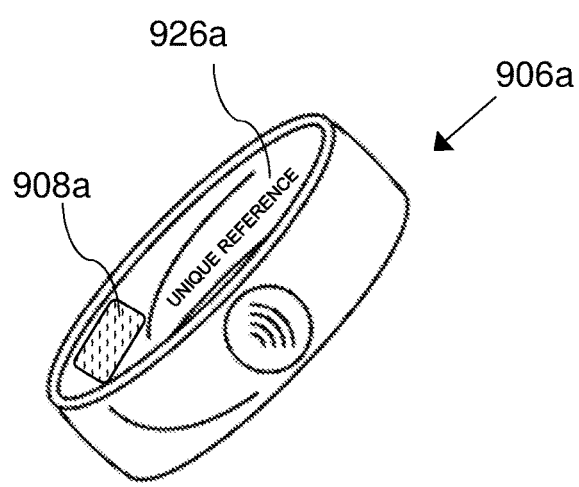
FIG. 9a is a schematic diagram showing a wristband including a chip and printed unique reference code, in accordance with a sixth embodiment of the present disclosure.

A wristband 906*a* in accordance with a sixth embodiment is shown in FIG. 9*a*. The wristband 906*a* comprises a chip 908*a* and a printed unique reference code 926*a*. The chip may be an EMV chip, thereby associated with the EMV chip specifications. The secure EMV chip provides the ability to store confidential information securely, perform processing functions and perform cryptographic processing. The chip 908*a* is capable of generating a cryptographically signed version of the unique reference stored within the memory of the chip 908*a*, in line with the first to fifth embodiments. Comparison of the unique reference obtained from the chip 908*a* to the unique reference code 926*a* printed on the wristband enables fast and efficient confirmation of chip and chip enclosure genuity.

Watch in Accordance with a Seventh Embodiment of the Present Disclosure

Figure 9B:
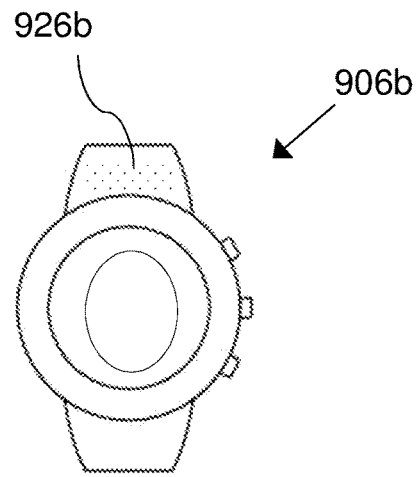
FIG. 9b is a schematic diagram showing a watch which includes a chip (not shown) and an invisible digital watermark comprising a unique reference code, in accordance with a seventh embodiment of the present disclosure.

A watch 906*b* in accordance with a seventh embodiment is shown in FIG. 9*b*. The watch 906*b* comprises a chip (not shown) and a digital watermark 926*b* comprising a unique reference code representing the uniqueness of the watch. The chip may be an EMV chip as described in any of the above embodiments. A cryptographically signed version of the unique reference code of the chip, in line with the first to fifth embodiments, is used to obtain a unique reference code which can be compared to the unique reference code comprised within the digital watermark 926*b*. Comparison of the unique reference code obtained from the chip to the unique reference code comprised within the digital watermark 926*b* enables fast and efficient confirmation of chip and chip enclosure genuity.

Key Fob in Accordance with an Eight Embodiment of the Present Disclosure

Figure 9C:
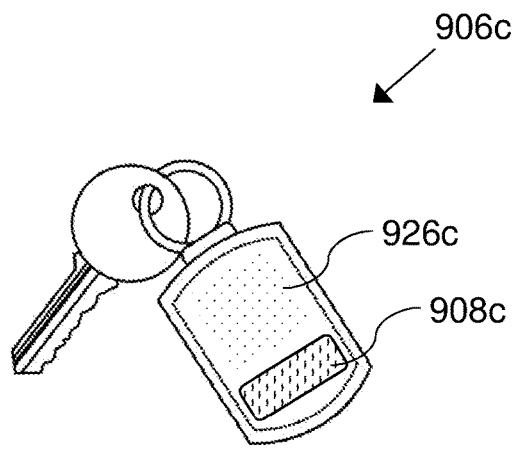
FIG. 9c is a schematic diagram showing a key fob including a chip and a digital watermark comprising a unique reference code, in accordance with an eighth embodiment of the present disclosure.

A key fob 906*c* in accordance with an eight embodiment is shown in FIG. 9*c*. The key fob 906*c* comprises a chip 908*c* and a digital watermark 926*c* comprising a unique reference code representing the uniqueness of the key fob 906*c*. The chip may be an EMV chip as described in any of the above embodiments. A cryptographically signed version of the unique reference code of the chip 908*c*, in line with the first to fifth embodiments, is used to obtain a unique reference code which can be compared to the unique reference code comprised within the digital watermark 926*c*. Comparison of the unique reference code obtained from the chip 908*c* to the unique reference code comprised within the digital watermark 926c enables fast and efficient confirmation of chip and chip enclosure genuity.

Sticker in Accordance with an Ninth Embodiment of the Present Disclosure

Figure 9D:
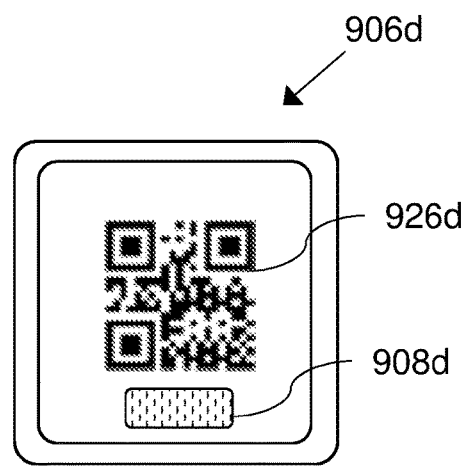
FIG. 9d is a schematic diagram showing a sticker including a chip and a QR code comprising a unique reference code, in accordance with a ninth embodiment of the present disclosure.

A sticker 906d in accordance with an ninth embodiment is shown in FIG. 9d. The sticker 906d comprises a chip 908d and a QR code 926d comprising a unique reference code representing the uniqueness of the sticker 906d. The chip 908d may be an EMV chip as described in any of the above embodiments. A cryptographically signed version of the unique reference code of the chip 908d, in line with the first to fifth embodiments, is used to obtain a unique reference code which can be compared to the unique reference code comprised within the QR code 926d. Comparison of the unique reference code obtained from the chip 908d to the unique reference code comprised within the QR code 926d enables fast and efficient confirmation of chip and chip enclosure genuity.

Hardware Architecture of Mobile Computing Device

Figure 10:
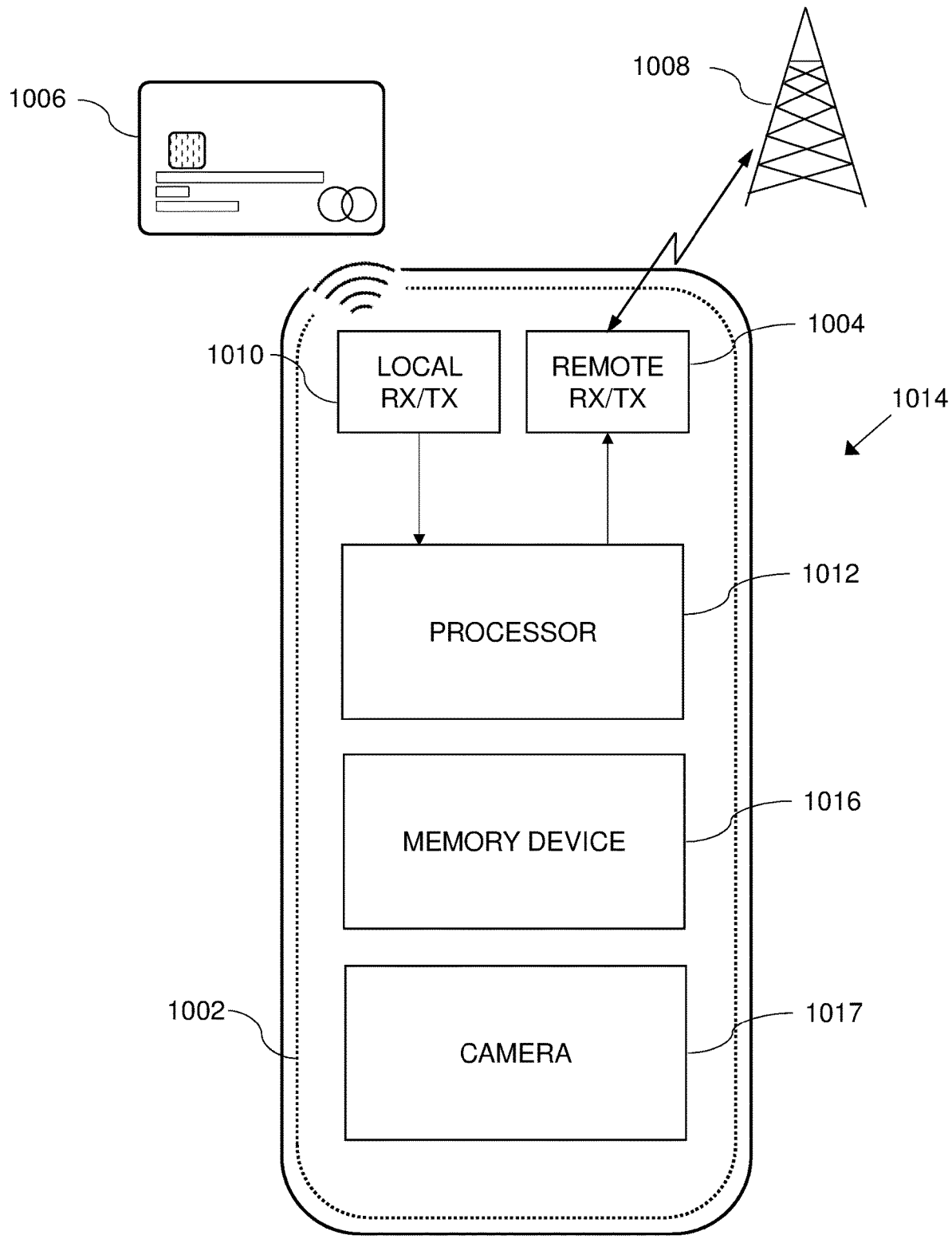
FIG. 10 is a schematic diagram showing the hardware architecture of a mobile computing device suitable for implementing embodiments of the present disclosure.

FIG. 10 shows the hardware architecture of a smartphone 1014 which is suitable for use with embodiments of the present disclosure. The term 'smartphone' may be used synonymously herein with 'mobile cellular telecommunications handset' or 'mobile phone' or 'mobile device'. Other mobile computing devices may be used instead of the smartphone 1014. The mobile computing device may be another type of computing device such as a tablet or a laptop computer. The mobile computing device need not have cellular telecommunications capabilities (so long as some form of data connection, such as a Wi-Fi or Ethernet connection, is available).

In general, mobile computing devices comprising the hardware elements shown in the smartphone 1014 of FIG. 10 are suitable for use with embodiments of the present disclosure.

The smartphone 1014 has a display 1002 providing, in this example, a touchscreen user interface. The smartphone 1014 is equipped with a remote wireless telecommunications apparatus comprising a remote transmitter/receiver 1004 for communication with a wireless telecommunications network 1008. The smartphone 1014 is also equipped with a local wireless telecommunications apparatus comprising a local transmitter/receiver 1010 for communication with a local transaction device such as a payment card 1006. For example, the local transmitter/receiver 1010 may comprise an NFC receiver to enable the smartphone 1014 to receive data from a payment card 1006 which is capable of transmitting data via NFC. The local transmitter/receiver 1010 may also comprise an NFC transmitter for transmitting data from the smartphone 1014 to a local device.

In some embodiments, the smartphone 1014 has an NFC controller chip, which includes both an NFC transmitter and an NFC receiver. The NFC controller chip is configured to adhere to at least the ISO 14443 standards, and the relevant EMV or card scheme's payment or terminal application standards. The smartphone 1014 further comprises a processor 1012, a memory device 1016, and a camera 1017. The camera 1017 is configured to capture image data such as an image printed on a payment card 1006 of the present disclosure, e.g. digital watermark or QR code printed on the card.

Software Architecture of Mobile Computing Device

Figure 11:
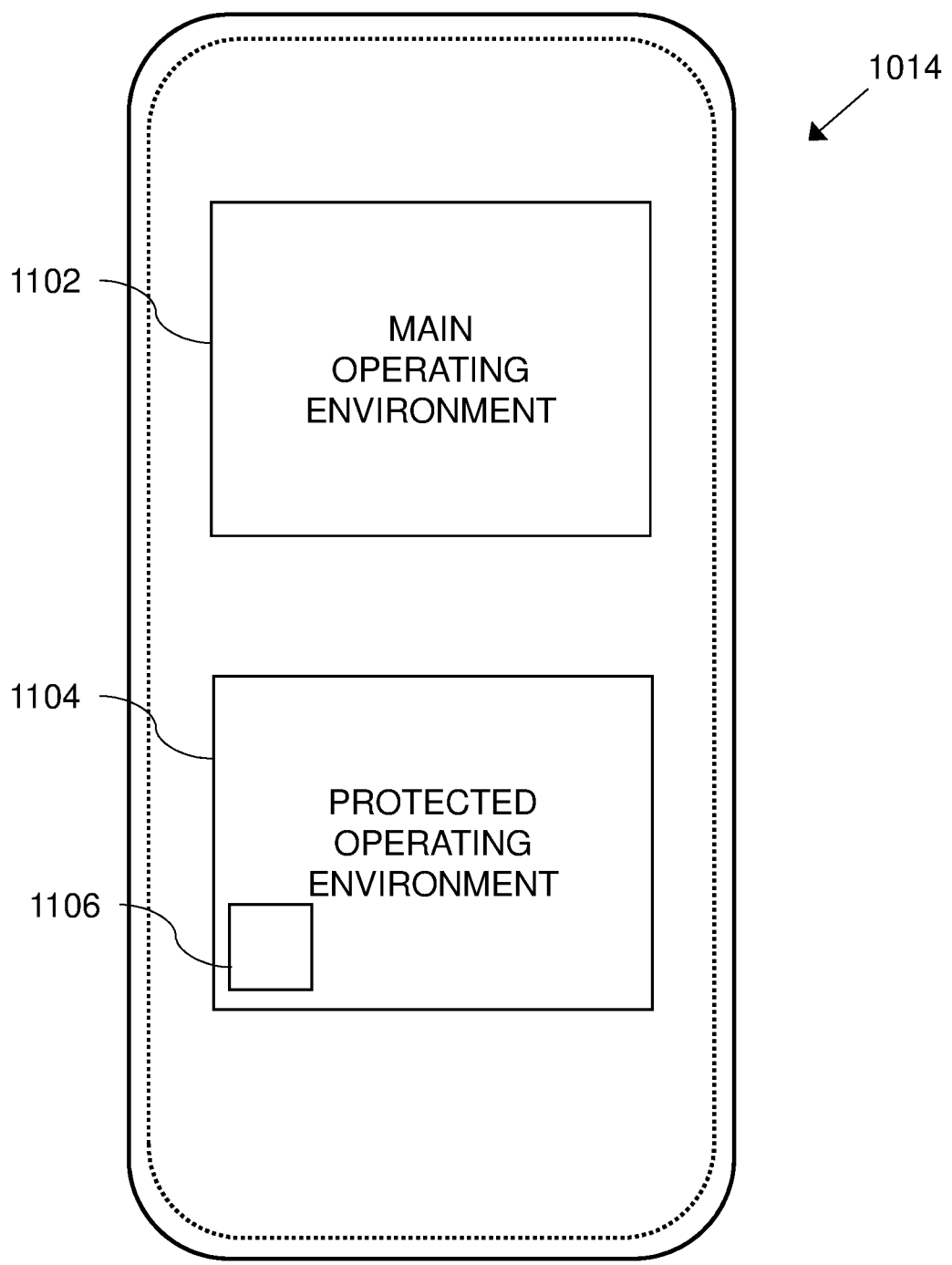
FIG. 11 is a schematic diagram showing the software architecture of a mobile computing device suitable for implementing embodiments of the present disclosure.

FIG. 11 shows the software architecture of the smartphone 1014 shown in FIG. 10. The software architecture has a main operating environment 1102 and a protected operating environment 1104.

The main operating environment 1102 may be used with a generic operating system such as iOS or Android. The main operating environment 1102 comprises a mobile service application. The main operating environment 1102 also comprises other applications that are normally needed by such a mobile computing device, such as a browser, a modem and a camera driver (not shown).

The protected operating environment 1104 may be a Subscriber Identity Module SIM, Universal Integrated Circuit Card UICC, a Secure Element or a hardware backed Trusted Execution Environment. Alternatively, there may be a sandbox or other logically protected environment in the main operating environment to provide a secure environment. This may involve using one or more external resources to provide a secure environment.

The protected operating environment 1104 may comprise a mobile banking application 1106 or 'app' for making in-app payments or payments at POS terminals. The mobile banking application 1106 can be accessed by a user of the smartphone 1114. Alternatively, the elements relevant to the security of the mobile banking application 1106 may be comprised in the protected operating environment. The mobile banking application 1106 may be located within the SIM or within another physically or logically protected environment. Alternatively, some parts of the mobile banking application 506 may be situated in the protected operating environment. Further, data from the application 1106 may be located in a protected memory.

Within the mobile banking application 1106, image data which has been captured by the camera 1017 is resolved in order to recover the data comprised within the image data, namely the unique reference code embedded within the image. Alternatively, the unique reference code may be recovered from the image data outside of the mobile banking application 1106.

Many modifications may be made to the specific embodiments described above without departing from the scope of the invention as defined in the accompanying claims. Features of one embodiment may also be used in other embodiments, either as an addition to such embodiment or as a replacement thereof.

The invention claimed is:

1. A transaction device (306), comprising:
    a chip enclosure comprising a reference code portion (326) having a readable reference code associated with a user account;
    a chip (308) embedded in the chip enclosure, the chip (308) being separate from the readable reference code portion and having account information associated with the user account and the reference code stored therein; and
    wherein the chip (308) is configured to generate a cryptographically signed version of the reference code stored in the chip (308) upon receipt of a request message by encrypting the reference code with a public key of a third party service provider and then digitally signing the reference code using a private key, such that the reference code is retrieved from the cryptographically signed version of the reference code of the chip (308) using the public key of the third party service provider and is sent to the third party service provider to decrypt the retrieved reference code with the private key of the third party service provider for comparison with the readable reference code of the reference code portion (326).

2. The transaction device of claim 1, wherein the transaction device comprises a card form factor.

3. The transaction device of claim 2, wherein the card form factor is a payment card form factor.

4. The transaction device of claim 3, wherein the payment card form factor is in accordance with ISO/IEC 7810 ID-1.

5. The transaction device of claim 1, wherein the transaction device comprises a non-card form factor.

6. The transaction device of claim 5, wherein the transaction device comprises a wearable device.

7. The transaction device of claim 6, wherein the wearable device comprises a bracelet, a wristband (906 *a*), a watch (906 *b*) or a ring.

8. The transaction device of claim 5, wherein the transaction device comprises an attachment device.

9. The transaction device of claim 8, wherein the attachment device comprises a sticker (906 *d*), key fob (906 *c*), or a tag.

10. The transaction device of claim 1, wherein the chip enclosure comprises a QR code (526) and wherein the readable reference code is encoded within the QR code (526).

11. The transaction device of claim 1, wherein the chip enclosure comprises an invisible digital watermark and wherein the readable reference code is encoded within the invisible digital watermark.

12. The transaction device of claim 1, wherein the chip enclosure comprises a visible digital watermark and wherein the readable reference code is encoded within the visible digital watermark.

13. The transaction device of claim 10, wherein the chip enclosure comprises a hologram (724) and wherein the QR code (526, 726) is printed within the hologram (724).

14. The transaction device of claim 12, wherein the chip enclosure comprises a hologram (824) and wherein the digital watermark (826) is printed within the hologram (824).

15. A method of a manufacturing a transaction device, the method comprising:
- storing account information and a reference code associated with a user account in a chip (308);
- positioning the chip (308) on a chip enclosure;
- embedding the chip (308) in the chip enclosure;
- applying the reference code to a reference code portion of the chip enclosure in a readable format, the reference code portion being separate from the chip,
- wherein the chip (308) is configured to generate a cryptographically signed version of the reference code stored in the chip (308) upon receipt of a request message by encrypting the reference code with a public key of a third party service provider and then digitally signing the reference code using a private key, such that the reference code is retrieved from the cryptographically signed version of the reference code of the chip (308) using the public key of the third party service provider and is sent to the third party service provider to decrypt the retrieved reference code with the private key of the third party service provider for comparison with the readable reference code of the reference code portion (326).

\* \* \* \* \*